United States Patent
Manner et al.

(10) Patent No.: US 11,438,788 B2
(45) Date of Patent: Sep. 6, 2022

(54) METHOD FOR DETERMINING A PERFORMANCE INDICATOR OF A WIRELESS TELECOMMUNICATIONS NETWORK

(71) Applicant: Celltrum Oy, Espoo (FI)

(72) Inventors: Jukka Manner, Helsinki (FI); Sebastian Sonntag, Espoo (FI); Tomi Paatsila, Espoo (FI); Eren Boz, Espoo (FI)

(*) Notice: Subject to any disclaimer, the term of this patent is extended or adjusted under 35 U.S.C. 154(b) by 64 days.

(21) Appl. No.: 17/252,301

(22) PCT Filed: Jun. 14, 2019

(86) PCT No.: PCT/FI2019/000012
§ 371 (c)(1),
(2) Date: Dec. 15, 2020

(87) PCT Pub. No.: WO2019/239005
PCT Pub. Date: Dec. 19, 2019

(65) Prior Publication Data
US 2021/0266777 A1    Aug. 26, 2021

(30) Foreign Application Priority Data

Jun. 15, 2018 (FI) .................................. 20187084
Dec. 21, 2018 (FI) .................................. 20187189

(51) Int. Cl.
*H04W 28/02* (2009.01)
*H04L 43/0852* (2022.01)
(Continued)

(52) U.S. Cl.
CPC ..... *H04W 28/0236* (2013.01); *H04L 43/0852* (2013.01); *H04L 47/115* (2013.01);
(Continued)

(58) Field of Classification Search
CPC ............. H04W 28/0236; H04W 24/10; H04W 28/0268; H04W 28/0284; H04W 4/021;
(Continued)

(56) References Cited

U.S. PATENT DOCUMENTS 11,044,636 B2 * 6/2021 Moon ................... H04W 28/10
11,064,389 B1 * 7/2021 Sevindik ............... H04W 40/12
(Continued)

FOREIGN PATENT DOCUMENTS

WO    WO2017015462 A1    1/2017

OTHER PUBLICATIONS

Budiman et al, "Measuring Quality of Service for Mobile Internet Services", IEEE, 2016 (Year: 2016).*
(Continued)

*Primary Examiner* — Omer S Mian
(74) *Attorney, Agent, or Firm* — Jacob Eisenberg

(57) ABSTRACT

The present disclosure is related to wireless telecommunications networks and in particular to measuring and determining performance of a wireless telecommunications network. The network may be a cellular network, a WiFi network, or a combination of both. The present disclosure is further directed to a method for determining a parameter indicating quality of service for a wireless connection. In the method, changes in latency over a connection are measured using probe packets and if an increase of latency that is over a predetermined relative threshold is observed, the wireless connection is determined to be congested.

8 Claims, 3 Drawing Sheets

(51) Int. Cl.
*H04L 47/11* (2022.01)
*H04W 24/10* (2009.01)

(52) U.S. Cl.
CPC ....... *H04W 24/10* (2013.01); *H04W 28/0268* (2013.01); *H04W 28/0284* (2013.01)

(58) Field of Classification Search
CPC .. H04W 24/08; H04L 43/0852; H04L 47/115; H04L 43/0864; H04L 43/16; H04L 41/5067; H04L 43/0888; H04L 43/10
See application file for complete search history.

(56) References Cited

U.S. PATENT DOCUMENTS

| | | |
|---|---|---|
| 11,082,886 B2* | 8/2021 | Streijl ............... H04W 72/1252 |
| 2014/0269326 A1 | 9/2014 | Westin et al. |
| 2016/0156680 A1 | 6/2016 | Pinter et al. |
| 2017/0013493 A1 | 1/2017 | HomChaudhuri et al. |
| 2017/0279921 A1 | 9/2017 | Foulkes et al. |
| 2022/0022080 A1* | 1/2022 | Futaki .................. H04W 24/10 |

OTHER PUBLICATIONS

Waharte et al, "Interference-Aware Routing Metric for Improved Load Balancing in Wireless Mesh Networks", IEEE 2008 (Year: 2008).*

* cited by examiner

METHOD FOR DETERMINING A PERFORMANCE INDICATOR OF A WIRELESS TELECOMMUNICATIONS NETWORK

CROSS REFERENCE TO RELATED APPLICATION

This application is a national phase application of International Application No.: PCT/FI2019/000012, filed on Jun. 14, 2019 and claims the priority benefit of FI20187084, filed on Jun. 15, 2018 and FI20187189 filed on Dec. 21 2018, the content of all of the aforementioned being herein incorporated by reference.

BACKGROUND OF THE INVENTION

1. Field of the Invention

The current invention is generally related to wireless telecommunications networks, and particularly to measuring and determination of performance of a wireless telecommunications network, such as a cellular network, a WiFi network, or a combination of both.

2. Description of Related Art

There are many different ways to measure the quality of service provided by wireless telecommunication networks.

For example, one common way is to use drive through measurements, in which a number of measurement devices are driven around on a vehicle, while the devices perform measurements. These measurements typically create heavy synthetic traffic and simulate normal user traffic and may also observe the network at different locations. This measurement methods produces results that are comparable across networks and time. However, there are certain problems with this method. This method produces results that are tied to particular locations and times. This method does not provide continuous results from a given location or area. The method does not provide results in other locations at the measurement time, and thereby may not provide an accurate measurement result of the whole of the network. Furthermore, the created traffic is not real user traffic and thus gives information of network maximum throughput but not how well typical apps would perform.

A second common method for determining the quality of service provided by wireless telecommunication networks is by asking the users through panel studies. This approach has the benefit that the results directly describe how the users experience the quality of service of the network. However, there are some drawbacks. Conducting panel studies is a lot of work and typically have limited number of participants. Panel studies also do not provide continuous measurements. There is also uncertainty over whether the panel study covers a large enough base of users to produce reliable results, and whether different panel studies employ comparable sets of users producing comparable study results. Furthermore, in panel studies users might perceive quality of experience differently unless a technical means is introduced to devices of the users to ensure that results across users are comparable. Answers to panel questions are also typically highly subjective.

A third common method for determining the quality of service provided by wireless telecommunication networks is to use monitoring tools inside the wireless telecommunication network. A network operator has many different monitoring tools and measurements at his disposal. This approach has the benefit that measurements from inside the network can easily be used to cover a large part or all of the network. This approach also avoids any biases caused by user behavior. However, this approach has certain drawbacks as well. This approach can not provide information about other networks managed by other operators, as internal network information is typically kept as a trade secret, whereby this approach does not allow comparison of different networks. Further, this approach does not provide any information about how a user experiences the quality of service provided. Internal measurements can tell how much throughput the network was able to provide to the user, but that does not tell if the throughput was sufficient for the user at that moment nor about situations when no network access was available. Moreover, network internal mechanisms do not include the end user's physical location into the results, and thus the results can not be used to build for example coverage maps.

A fourth common method for determining the quality of service provided by wireless telecommunication networks is to use crowdsourcing, i.e. allowing users to report on perceived quality of service and/or measurement data. Typically, this involves loading an application on the mobile device of the user, and using that application to perform measurements and to report the results to the network. Typically these applications test the network connection by transmitting a large amount of synthetic data and measuring the transmission rate. This approach has the benefit that the measurements can provide results from different networks. Also, the measurements indicate the quality from the user's perspective. However, this approach has the drawback that typical crowdsourced measurements suffer from biases such as behaviour bias. For example, users tend to initiate a network speed measurement only when they notice slowness or other problems with the network, i.e. only when they are unhappy with the services. This effect tends to inject behavioural bias into the results. Furthermore, since user-initiated measurements produces results relatively seldom from each user, a very large number of users is needed for acquiring large amounts of measurement data. Also, measurements using user-initiated test loads provide information about the maximum transmission rates provided by the network at that particular time and location, but do not provide information on how well the network services the user with the actual use and applications of the user. Further, active measurements that test the connection using a large amount of generated data are costly in terms of bandwidth and battery.

A fifth method is to monitor passively the bit rate received and sent by the mobile device, by running a monitoring agent on the end user device. This method can create more data to analyze and does not include the user-initiated bias above. However, simply monitoring the bit rate does not reveal the reason why the user received any specific bit rate—was it because the used Internet service did not send more, or because the network was congested, or some other reason. Thus, the information received by passive data rate monitoring mechanisms is limited in applicability.

Furthermore, there are several other sources of bias that may effect crowdsource based measurements of quality of service of wireless telecommunication networks.

One bias source is user bias, which arises from the individual user or his equipment. A typical source of user bias is the device used by the user. Capabilities of that device may limit the maximum data rate obtainable using that device. A similar limitation may be caused by the wireless subscription that the user has bought. These are classified as user biases.

Behavioural bias is created, when the behaviour of the users affects the measurement results. For example, if the measurements are initiated by the user, behavioural bias often creeps in the results since a user is typically likely to initiate a measurement only when he observes slowness or other problems in the network connection, thereby biasing his results towards times of problems.

Location bias refers to bias caused by geographic location of the measurements. The distribution of users performing measurements in a crowdsourced approach varies over time as well as between different types of users, and the geographic coverage can never be complete or stay uniform. Furthermore, users typically perform measurements in the most common locations where they spend time and not in all locations where they use their mobile devices, which skews the measurement results even further.

A good solution for performing connection quality measurements that avoid these biases, while saving bandwith and device battery energy, is needed.

SUMMARY OF THE INVENTION

The present invention describes a method for determining performance of one or more wireless telecommunications networks based on crowdsourced measurements, allowing comparison of networks of different wireless telecommunication providers or for example comparison of a particular network in different times, i.e. monitoring the development of performance of the network. Such a wireless telecommunication network can be a single homogenous network or a combination of networks, and can comprise networks based on different technologies such as a cellular telecommunications network or a WiFi based network.

The inventors have had the insight that a good quality indicator for customer experience that provides actionable information to a wireless network operator is data throughput rate provided to the customer when the wireless network is the limiting factor in data throughput.

The invention provides a method for determining a quality parameter of a wireless connection. The inventive method determines whether a connection is congested i.e. has a bottleneck by transmitting probe packets between a mobile device and a server entity in specific ways described later in this specification, and observing latency and changes in the latency between transmission and reception.

If the latency experienced by probe packets is observed to increase over a threshold, the method determines that there is congestion in the connection over which the probe packets travel. The inventive method provides certain ways to determine the threshold.

The method assumes that the main source of bottlenecks between a mobile device and a content or a probe server is the radio network, and that the effect of the connection between the radio network and the server is negligible. This is a safe assumption, as bandwidth that is available in a fixed network is considerably larger than the bandwith of a radio connection. Base stations to which mobile devices connect over the radio interface are typically connected to the rest of the network using optical fibre or other high-speed links.

An increasing latency over a radio connection is a symptom of a situation, in which more data is arriving at a transmitter such as a base station than the transmitter can forward over the radio link. In such a situation data is queued in buffers, which increases the latency experienced by the data packets.

In an uncongested network, the latency is fairly stable. There is always some variation in latency over time even in an uncongested network. When a connection is lightly loaded, the latency is typically fairly constant, with small variations which depend on the technology employed by the wireless connection, as well as the route of the probe packets to the probe server. The absolute value of the latency is very dependent on the technology employed by the wireless connection.

A typical latency for an uncongested WiFi connection is on the order of milliseconds, and can typically be up to 10 milliseconds. A 3G wireless connection typically has a latency of roughly 100 ms if the connection quality is good, and can be larger. In a 4G network, a typical round trip latency can be roughly 60 milliseconds.

In the method, changes of latency are used to determine the congestion status of a connection, rather than a comparison to a fixed latency value. In an embodiment of the invention, a relative increase larger than a predetermined threshold is used in determination of the congestion status of a connection.

In an embodiment of the invention, the technology employed by the wireless connection is used as one factor in determining a base latency value indicating an uncongested connection.

In a further embodiment of the invention, latency measurement results are used in determination of a base latency value indicating an uncongested connection.

Further, the way the latency changes due to congestion varies by the technology employed by the wireless connection. In a further embodiment of the invention, the technology employed by the wireless connection is used as one factor in determining the relative threshold which is used for determination of a congested status.

In an embodiment of the method, transmission of probe packets is initiated only if certain conditions are fulfilled, in order to save resources such as bandwidth and battery power of the mobile device. Different embodiments of the invention employ different conditions for determining whether transmission of probe packets should be initiated.

A purpose of such conditions is avoidance of unnecessary transmission of probe packets. If only small messages are being sent, these will not cause congestion in a typical situation. However, if the mobile device is transmitting for example a set of 10 large IP packets, this can be assumed to be a sign of a period of higher traffic, either uplink or downlink traffic. Sending probe packets only at times when a considerable data traffic is taking place saves resources such as bandwidth and battery usage.

In different embodiments, these conditions can apply to reception of data, transmission of data, or both.

In an embodiment of the invention, transmission of probe packets is initiated if data transmission over the connection exceeds a predefined amount in a predefined period of time. This can be implemented for example, by determining whether a predetermined number of data packets exceeding a predetermined size are sent and/or received within a predetermined period of time.

In a further embodiment of the invention, the conditions include a condition of whether a predetermined amount of time after opening of a data connection has passed. For example, the predetermined amount of time can be one second, or another predetermined time period.

In a further embodiment of the invention, the conditions include whether data is being sent over a connection. In such an embodiment, transmission of probe packets is initiated when data is transmitted over the connection.

In different embodiments of the invention, any one or more of these conditions can be used in different combinations.

In an embodiment of the invention, the conditions observe traffic at the IP (Internet Protocol) level, whereby the method provides measurement results irrespective of any higher level protocols being used.

In an embodiment of the invention, the set of conditions include the type of technology employed by the wireless connection. For example, parameters of conditions—such as amount of traffic within a predetermined time period—can be dependent on the radio technology used.

In further embodiments of the invention similar conditions can be used as conditions for stopping transmission of probe packets. For example, in an embodiment of the invention transmission of probe packets is stopped when it is determined that the amount of traffic transmitted and/or received during a predetermined time period is below a predetermined threshold. For example, in a further embodiment of the invention, transmission of probe packets is stopped after a predetermined time period after last transmission and/or reception of any other traffic than probe packets or response packets to transmitted probe packets.

In an embodiment of the invention, the inventive method is performed by a mobile device, such as a mobile communication device.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

Various embodiments of the invention will be described in detail below, by way of example only, with reference to the accompanying drawings, of which

Same reference numerals are used for similar entities in the figures.

DETAILED DESCRIPTION OF THE INVENTION

The following embodiments are exemplary. Although the specification may refer to "an", "one", or "some" embodiment(s), this does not necessarily mean that each such reference is to the same embodiment(s), or that the feature only applies to a single embodiment. Features of different embodiments may be combined to provide further embodiments.

In the following, features of the invention will be described with a simple example of a method with which various embodiments of the invention may be implemented. Only elements relevant for illustrating the embodiments are described in detail. Details that are generally known to a person skilled in the art may not be specifically described herein.

Figure 1:
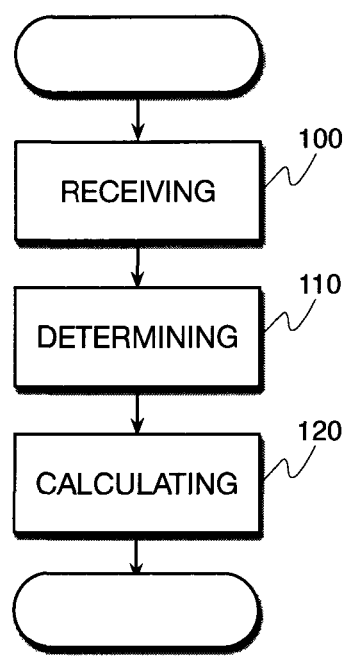
FIG. 1 illustrates a method according to an embodiment of the invention.

FIG. 1 illustrates a method according to an embodiment of the invention. The embodiment provides a method for determining a parameter indicating quality of service received by users of at least one wireless telecommunications network. As illustrated in FIG. 1, the method according to this embodiment comprises the steps of receiving 100 sets of measurement information from a plurality of mobile devices connected to said at least one wireless telecommunications network about throughput rate of data between said mobile devices and said at least one wireless telecommunications network, said sets of measurement information comprising at least data throughput rate measured at over a period of time,
time of said measurement, and
location information at that time;

determining 110, for each set of measurement information, whether the wireless network was a limiting factor of the throughput rate at the time of that measurement, and calculating 120 a quality of service parameter on the basis of such sets of measurement information for which the wireless network was determined to be a limiting factor.

The determination of whether the wireless network was a limiting factor during a measurement can be performed in any of the various ways described in this specification. For example, the determination of whether the wireless network is a limiting factor can be performed by determining if the wireless connection through the wireless network is congested.

In an embodiment of the invention, sets of measurement information received in step 100 are stored in a database for later analysis.

The location information in a set of measurement information can be for example geographical coordinates, if these are available from the satellite location service functionality of the mobile device, or for example network specific location information such as a cell identifier.

In a further embodiment of the invention, the sets of measurement information also include information of which cellular telecommunication network said sets of measurement information were measured with. This can be implemented for example by including an identifier of a wireless telecommunications network and/or an operator of a wireless telecommunications network in a set of measurement information.

Said data throughput rate may in various embodiments of the invention be uplink throughput, downlink throughput, or a combination of both.

The determination whether the wireless network was a limiting factor of the throughput rate at the time of the measurement can in various embodiments of the invention be implemented in different ways.

For example, if a wireless network comprises functionality for detecting a high load situation causing congestion, the network can give a signal to a mobile device that a congestion situation exists, in order to allow the mobile device to adjust its operation. In an embodiment of the invention, this mechanism is used to provide an indication of a congestion situation where the wireless network is a limiting factor of the throughput rate at the time of a measurement. In such an embodiment, the mobile device can indicate the existence of a congestion situation by including congestion status information it has received from the network and/or calculated based at least in part on information it has received from the network along with a set of measurement information.

One known mechanism for indicating a congestion situation is known as the Explicit Congestion Notification (ECN) mechanism, which is an extension to the Internet Protocol and to the Transmission Control Protocol and is defined in RFC 3168. The ECN mechanism allows a receiving network entity to indicate congestion to a transmitting entity, whereby transmitting entity then can reduce transmission rate to help in relieving the congestion. The ECN mechanism or other congestion signalling mechanisms can be utilized in different embodiments of the invention.

In a further embodiment of the invention, the determination whether the wireless network was a limiting factor of the throughput rate at the time of the measurement can be performed on the basis of state information within the mobile device. For example, state information related to the transmission control protocol (TCP) software stack may indicate such a situation. For example, if delays are present in all TCP connections of a mobile device, it is probable that the wireless network is a limiting factor.

Figure 2:
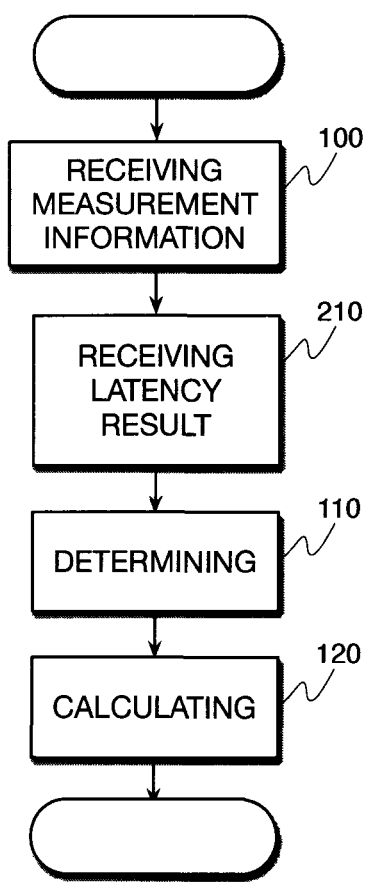
FIG. 2 illustrates a method according to an embodiment of the invention in which any latencies caused by the wireless network are measured with probe packets.

FIG. 2 illustrates a method according to an embodiment of the invention in which any latencies caused by the wireless network are measured with probe packets. In this embodiment, a software application in mobile device transmits a number of probe packets to a probe server entity, which then responds by sending response packets. The probe packets are sent at predefined intervals, and the response time of the probe server and/or the measured intervals between received response packets are used in determination whether the wireless network is a limiting factor in service quality. In an embodiment of the invention, the mobile device transmits these probe packet measurement results or result values calculated at least in part based on the probe packet measurement results along with a set of measurement information collected during the roughly same time period when the probe packet measurements were performed.

The actual determination of whether or not the wireless network was a limiting factor of the throughput rate at the time of the measurement based on the probe packet measurements can in an embodiment of the invention be implemented in a network server entity performing the inventive method.

FIG. 2 shows the step of receiving 100 a set of measurement information from a mobile device, and the step of receiving 210 from a mobile device a latency measurement result along with a set of measurement information, said latency measurement result having been created with the steps of transmitting, by said mobile device, a plurality of probe data packets at predetermined first time intervals to a server entity, receiving, by said mobile device, response packets from said server entity and measuring the received millisecond time intervals between said received response packets, and calculating said latency measurement result based on said first and second time intervals. In different embodiments of the invention, the steps 100 and 210 can be implemented in the opposite order than the one shown in FIG. 2, or be implemented in a single receiving step.

In step 110 of FIG. 2, the determination of whether the wireless network was a limiting factor of the throughput rate at the time of the measurement is performed on the basis of received latency information. In step 120 a quality of service parameter is calculated on the basis of such sets of measurement information for which the wireless network was determined to be a limiting factor.

In a further embodiment of the invention, the sets of measurement information are received in probe data packets transmitted by a mobile device for performing a latency measurement, and extracted from the probe data packets. In such an embodiment, the steps 100 and 210 are performed in a single step of receiving a probe data packet from a mobile device, and extracting said measurement results from the probe data packet. Thereby the measurement results are transmitted from the mobile devices in a near real-time manner; as a probe data packet can carry the most recent measurement information available at the time of transmitting the probe data packet.

Figure 3:
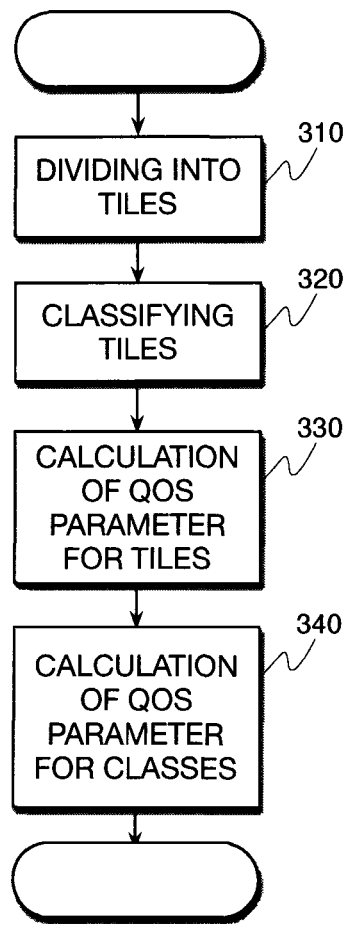
FIG. 3 illustrates a method according to an embodiment of the invention as an example of how to reduce the effect of location bias.

FIG. 3 illustrates a method according to an embodiment of the invention as an example of how to reduce the effect of location bias.

The geographical area under observation is divided 310 into tiles that are small enough to not have any location bias effect within a single tile. The tiles can be for example of size of roughly 100 meters by 100 meters. However, the invention is not limited to any specific size of the tiles. The size of the tiles can be smaller, for example 50 by 50 meters, or even larger, for example 1 kilometer by 1 kilometer. Further, the invention is not limited to any specific shape of the tiles, as the shape of the tiles can be implementation specific. Naturally, square tiles may be easy to implement, but other shapes can be used as well.

The tiles are classified 320 into at least two classes based on data having a geographical distribution. For example, the classes could represent how rural or urban the geographical area of the tile is. For example, in an embodiment of the invention, the tiles are classified in three classes: rural, urban, and city. However, the number of classes is not limited to three, as in various embodiments of the invention there can be two classes or more than three. For example, in a further embodiment of the invention, the tiles are classified in four classes: rural, urban, city, and city center. The classification can be performed using any publically available data source that represents data that can be used to infer such classification. Such data could be for example population density, or for example density of houses or housing units. A further example of such data is geography type, where the classes could be forested area, water, mountain area, and built area. This kind of classification produces useful results for a network opeartor, as this classification reflects how the network signal propagates in a given tile. A still further example of such data is geographical distribution of income of the population, as this kind of classification has an impact on marketing campaigns and for example network investments targeted to specific areas. Population density is just one example of a useful classification source that is straightforward for an operator to use, since population density is generally publically available data that a wireless network operator typically has, since population density is one of the most important parameters to consider in building a wireless network.

For mitigating the location bias, a quality of service parameter is calculated 330 only for tiles that have more measurement result sets whose location information falls within the geographic area of the tile than a first predetermined limit. Further, calculation of a quality of service parameter for a class of tiles (e.g. rural, urban, city) is performed 340 only for classes for which more tiles than a second predetermined limit are available with enough measurement results. The values of the first and second predetermined limits are implementation specific, and can be determined so as to provide statistically significant results. A benefit of the analysis method illustrated with reference to FIG. 3 is that the effect of location bias in the analysis output is greatly reduced.

Figure 4:
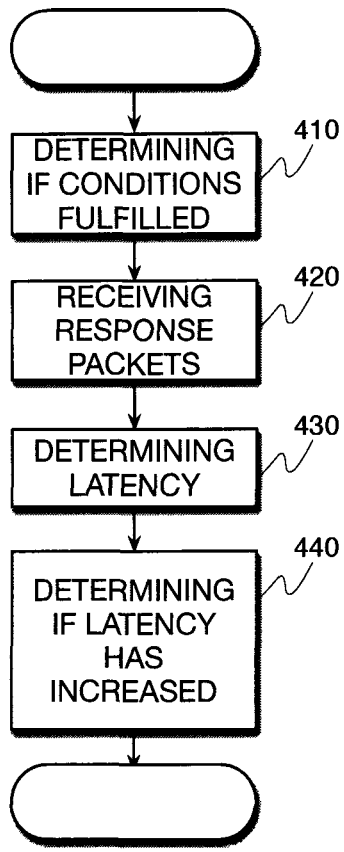
FIG. 4 illustrates a further method according to an embodiment of the invention.

FIG. 4 illustrates a method according to a further embodiment of the invention. FIG. 4 illustrates a method for determining a parameter indicating quality of service for a wireless connection to a wireless telecommunications network. The method comprises at least the steps of determining 410 if a first set of conditions is fulfilled, and if said first set of conditions is fulfilled, initiating transmission of a sequence of probe packets, receiving 420 response packets to transmitted probe packets, determining 430 latency from time difference of transmission time of a probe packet and reception time of a received response packet corresponding to the transmitted probe packet, and determining 440 if latency has increased more than a predetermined relative increase over a predetermined base latency value, and if the latency has increased more than a predetermined relative increase over a predetermined base latency value, determining that the wireless connection is congested.

Figure 5:
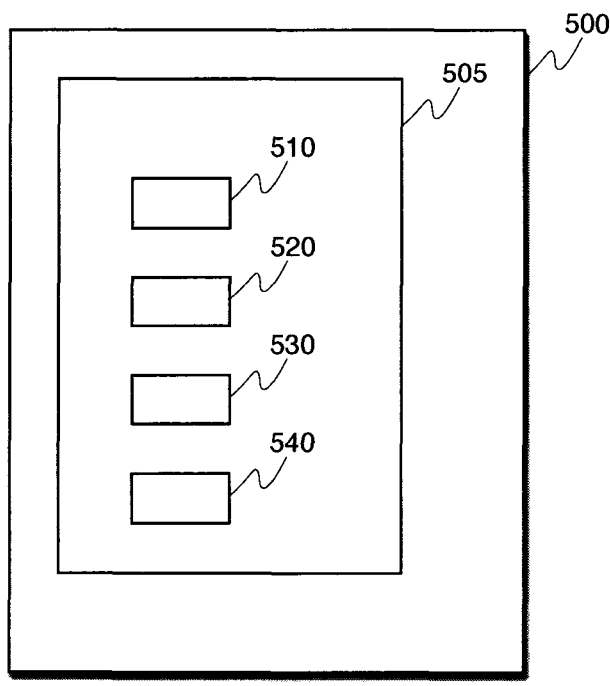
FIG. 5 illustrates a further embodiment of the invention, in which the invention is implemented as a non-transitory machine-readable medium storing a program.

FIG. 5 illustrates a further embodiment of the invention, in which the invention is implemented as a non-transitory machine-readable medium 500 storing a program 505 comprising computer-readable instructions, which when executed by a processor cause the processor to execute operations for determining a parameter indicating quality of service for a wireless connection to a wireless telecommunications network. The computer-readable instructions comprise instructions 510 for determining if a first set of conditions is fulfilled, and if said first set of conditions is fulfilled, initiating transmission of a sequence of probe packets, instructions 520 for receiving response packets to transmitted probe packets, instructions 530 for determining latency from time difference of transmission time of a probe packet and reception time of a received response packet corresponding to the transmitted probe packet, and instructions 540 for determining if latency has increased more than a predetermined relative increase over a predetermined base latency value, and if the latency has increased more than a predetermined relative increase over a predetermined base latency value, determining that the wireless connection is congested.

The non-transitory machine-readable medium 500 can be for example a memory means such as a CD-ROM, a storage device such as a flash memory device or a hard disk. The processor can be for example a processor of a mobile device, such as a mobile communications device.

The invention and its various embodiments have a number of benefits.

The inventive method allows comparison of wireless networks of different operators. The inventive method allows comparison of performance of the same operator over different periods of time, which allows for detection of changes in the performance.

An embodiment of the invention in which probe packet-based determination is used in determining whether the network is a limiting factor in the data throughput rate, especially user bias is strongly reduced. At time periods where the network is the cause of reduced data transmission rates, any user biases such as capabilities of the user's device do not enter into the measurement results.

An embodiment of the invention in which probe packet-based determination is used in determining whether the network is a limiting factor in the data throughput rate, can be easily implemented in all wireless telecommunication networks, since such an embodiment does not require support from the particular wireless network or support from content providing servers. Such an embodiment can therefore be implemented as an overlay solution on a legacy infrastructure, without requiring any changes to be made to the network.

Reducing effects of bias sources such as user and location bias allows obtaining of good quality, actionable measurement results with wide area coverage without requiring a near-infinite number of individual measurements.

The inventive method is very light in resource usage, saving transmission bandwith and battery of the mobile device. The method also produces accurate results that indicate the connection quality experienced by the user of the mobile device, since the method performs measurements alongside normal data traffic caused by the use of the mobile device.

In the following, we describe a number of embodiments of the invention.

According to a first aspect of the invention, a method for determining a parameter indicating quality of service for a wireless connection to a wireless telecommunications network is provided. In a first embodiment of this first aspect of the invention, the method comprises at least the steps of determining if a first set of conditions is fulfilled, and if said first set of conditions is fulfilled, initiating transmission of a sequence of probe packets, receiving response packets to transmitted probe packets, determining latency from time difference of transmission time of a probe packet and reception time of a received response packet corresponding to the transmitted probe packet, and determining if latency has increased more than a predetermined relative increase over a predetermined base latency value, and if the latency has increased more than a predetermined relative increase over a predetermined base latency value, determining that the wireless connection is congested.

In a second embodiment of this first aspect of the invention, said first set of conditions comprises the condition of whether amount of traffic over the wireless connection exceeds a predetermined limit in a predetermined amount of time.

In a third embodiment of this first aspect of the invention, determination of said base value comprises collection of a plurality of latency measurement results.

In a fourth embodiment of this first aspect of the invention, determination of said base value comprises determination of the technology of the radio link of the wireless connection.

In a fifth embodiment of this first aspect of the invention, the method further comprises the steps of collecting sets of measurement information, and calculating a quality of service parameter on the basis of such sets of measurement information during which the wireless network was determined to be congested.

According to a second aspect of the invention, a non-transitory machine-readable medium having stored thereon computer-readable instructions is provided. In a first embodiment of this second aspect of the invention these instructions, which when executed by a processor, cause the processor to execute operations for determining a parameter indicating quality of service for a wireless connection to a wireless telecommunications network, the operations carrying out the method comprising:

determining if a first set of conditions is fulfilled, and if said first set of conditions is fulfilled, initiating transmission of a sequence of probe packets, receiving response packets to transmitted probe packets, determining latency from time difference of transmission time of a probe packet and reception time of a received response packet corresponding to the transmitted probe packet, and determining if latency has increased more than a predetermined relative increase over a predetermined base latency value, and if the latency has increased more than a predetermined relative increase over a predetermined base latency value, determining that the wireless connection is congested.

According to a second embodiment of this second aspect of the invention, said first set of conditions comprises the condition of whether amount of traffic over the wireless connection exceeds a predetermined limit in a predetermined amount of time.

According to a third embodiment of this second aspect of the invention, determination of said base value comprises collection of a plurality of latency measurement results.

According to a second embodiment of this second aspect of the invention, determination of said base value comprises determination of the technology of the radio link of the wireless connection.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the previous description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for determining a parameter indicating quality of service for a wireless connection to a wireless telecommunications network, of the method comprising the steps of:

receiving sets of measurement information, at a network server, from a plurality of mobile devices connected to said at least one wireless telecommunications network about throughput rate of data between said plurality of mobile devices and said at least one wireless telecommunications network, each of said sets of information comprising at least:

data throughput rate measured at over a period of time at a respective one of said plurality of mobile devices, a corresponding time of when said measurement is performed, and a corresponding location information of the respective one of said plurality of mobile devices at the corresponding time; and calculating a quality-of-service parameter on the basis of said sets of measurement information for a time during which the wireless network was congested, a determination of the congestion of the wireless network performed, at each of the plurality of mobile devices, with at least the steps of:

determining if a first set of conditions is fulfilled, and if said first set of conditions is fulfilled, initiating transmission of a sequence of probe packets, receiving response packets to transmitted probe packets, determining latency from time difference of transmission time of a probe packet and reception time of a received response packet corresponding to the transmitted probe packet, and determining if latency has increased more than a predetermined relative increase over a predetermined base latency value, and if the latency has increased more than a predetermined relative increase over a predetermined base latency value, determining that the wireless connection is congested;

wherein the corresponding location information of each of the sets of measurement information falls within a section of a plurality of portions of a geographical area and the section is classified into a class of a plurality of classes of said portions based on different densities of the mobile devices.

2. The method according to claim 1 wherein said first set of conditions comprises the condition of whether amount of traffic over the wireless connection exceeds a predetermined limit in a predetermined amount of time.

3. The method according to claim 1, wherein a determining of the predetermined base latency value further comprises using a collection of a plurality of latency measurement results.

4. The method according to claim 1, wherein a determining of the predetermined base latency value comprises a determination of the technology of the radio link of the wireless connection.

5. A non-transitory computer-readable medium having stored thereon computer-readable instructions, which when executed by a processor, cause the processor to execute operations for determining a parameter indicating quality of service for a wireless connection to a wireless telecommunications network, the operations comprising:
  receiving sets of measurement information, at a network server, from a plurality of mobile devices connected to said at least one wireless telecommunications network about throughput rate of data between said plurality of mobile devices and said at least one wireless telecommunications network, each of said sets of information comprising at least:
    data throughput rate measured at over a period of time at a respective one of said plurality of mobile devices,
    a corresponding time of when said measurement is performed, and
    a corresponding location information of the respective one of said plurality of mobile devices at the corresponding time; and
  calculating a quality-of-service parameter on the basis of said sets of measurement information for a time during which the wireless network was congested, a determination of the congestion of the wireless network performed, at each of the plurality of mobile devices, with at least the steps of:
    determining if a first set of conditions is fulfilled, and if said first set of conditions is fulfilled, initiating transmission of a sequence of probe packets, receiving response packets to transmitted probe packets,
    determining latency from time difference of transmission time of a probe packet and reception time of a received response packet corresponding to the transmitted probe packet, and
    determining if latency has increased more than a predetermined relative increase over a predetermined base latency value, and if the latency has increased more than a predetermined relative increase over a predetermined base latency value, determining that the wireless connection is congested;
  wherein the corresponding location information of each of the sets of measurement information falls within a section of a plurality of portions of a geographical area and the section is classified into a class of a plurality of classes of said portions based on different densities of the mobile devices.

6. The non-transitory computer-readable medium according to claim 5, wherein said first set of conditions comprises the condition of whether amount of traffic over the wireless connection exceeds a predetermined limit in a predetermined amount of time.

7. The non-transitory computer-readable medium according to claim 5, wherein a determining of said predetermined base latency value further comprises using a collection of a plurality of latency measurement results.

8. The non-transitory computer-readable medium according to claim 5, wherein a determining of said predetermined base latency value comprises a determination of the technology of the radio link of the wireless connection.

* * * * *